(12) United States Patent
Mok

(10) Patent No.: US 7,190,983 B2
(45) Date of Patent: Mar. 13, 2007

(54) RADIO MODEM TERMINAL FOR MOBILE COMMUNICATION

(75) Inventor: Jin-Young Mok, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 10/618,637

(22) Filed: Jul. 15, 2003

(65) Prior Publication Data

US 2004/0214601 A1    Oct. 28, 2004

(30) Foreign Application Priority Data

Jul. 16, 2002  (KR) .................... 10-2002-0041699

(51) Int. Cl.
*H04M 1/00* (2006.01)
(52) U.S. Cl. .................. 455/575.3; 379/433.13
(58) Field of Classification Search ............. 455/575.3, 455/550.1, 557, 556, 575.1; 379/58, 433.13, 379/433.11, 433.12, 433.09
See application file for complete search history.

(56) References Cited

U.S. PATENT DOCUMENTS

| 5,594,952 | A | 1/1997 | Virtuoso et al. | 455/89 |
| 6,731,753 | B2 * | 5/2004 | Park et al. | 379/433.07 |
| 2001/0008000 | A1 * | 7/2001 | Kikinis et al. | 710/100 |
| 2001/0016508 | A1 * | 8/2001 | Kido et al. | 455/575 |

FOREIGN PATENT DOCUMENTS

| CN | 1189756 | 8/1998 |
| CN | 1302143 | 7/2001 |
| JP | 06-350118 | 12/1994 |
| JP | 08-076898 | 3/1996 |
| JP | 10023175 | 1/1998 |
| JP | 10-164171 | 6/1998 |
| JP | 2000-358090 | 12/2000 |
| JP | 2002-044203 | 2/2002 |
| KR | 20-0205570 | 9/2000 |
| KR | 2001-25245 | 4/2001 |
| KR | 2001-55682 | 7/2001 |
| KR | 20-0244885 | 8/2001 |
| KR | 2001-82432 | 8/2001 |

OTHER PUBLICATIONS

Japanese Office Action dated Apr. 3, 2006.

* cited by examiner

*Primary Examiner*—Edward F. Urban
*Assistant Examiner*—Tu X. Nguyen
(74) *Attorney, Agent, or Firm*—Fleshner & Kim LLP

(57) ABSTRACT

Disclosed is a radio modem terminal for mobile communication, comprising a main body having a functional unit for voice communication; a power supply unit hinged at one side of the main body; and a display unit disposed between the power supply unit and the main body, and also hinged with respect to the power supply unit and the main body to form a foldable type mobile communication device. When the radio modem terminal is not connected to a notebook computer, it can be used as a mobile communication terminal, using a power supply unit as its primary power source. However, if the radio modem terminal is connected to the notebook computer, it functions as the PC card, and uses power from the notebook computer as its primary source of power. Accordingly, the radio modem terminal is conveniently transported and used.

20 Claims, 4 Drawing Sheets

RADIO MODEM TERMINAL FOR MOBILE COMMUNICATION

BACKGROUND OF THE INVENTION

1. Field of the Invention

The present invention relates to mobile communication and, more particularly, to a radio modem terminal for mobile communication.

2. Background of the Related Art

In general, a mobile communication terminal is a device allowing users to communicate with anyone, anywhere, at any time, and due to their convenience, use of mobile communication terminals is now wide spread and a number of diverse applications have been developed for their use.

One such application is data communication. That is, by connecting a data port of the mobile communication terminal to a modem port of a notebook computer, access to various data communication and Internet services are made available to the user. The notebook computer has a variety of peripheral devices, such as an expansion memory, a data communication modem, LAN, or the like, which are connected to the notebook computer through a PCMCIA (Personal Computer Memory Card International Association) card or a PC card.

The construction of the PCMCIA card or the PC card is based on standards established by a PCMCIA industrial group organized in 1989 to promote standards for memory and input/output integrated circuits. The 1993 PCMCIA 2.1 standards dictate a card size of 54 mm in width by 85.6 mm in length, and a 68 pin connector.

The PC card can be classified into three types, depending on its thickness: TYPE 1 is mainly used for external memory expansion, and has a thickness of 3.3 mm; TYPE 2 is commonly used as a modem, LAN, a SCSI, or a sound card, and has a thickness of 5.0 mm; TYPE 3 is commonly used as an ATA (Advanced Technology Attachment) hard disk drive, and has a thickness of 10.5 mm.

FIG. 1 illustrates how a notebook computer is connected to a communication network in accordance with the conventional art, which includes: a mobile communication terminal 10 with access to a mobile communication service while being transported; a notebook computer 20 implementing radio communication through the mobile communication terminal 10; and a connecting unit 30 connecting a data port installed in the mobile communication terminal 10 and the notebook computer 20 to enable data communication therebetween.

The mobile communication terminal 10 is capable of receiving multimedia service as well as voice communication service and character information while being transported. In general, the mobile communication terminal includes a data port for data communication, through which the mobile communication terminal 10 can function as a speaker phone, update an operating program, and transmit and/or receive data.

The notebook computer 20 is a portable personal computer, in which various kinds of modems can be built therein or attached thereto for data communication with an external device. The connecting unit 30 is a cable connecting the data port of the mobile communication terminal 10 and a modem of the notebook computer 20, through which the mobile communication terminal 10 and the notebook computer 20 can conduct data communication with another computer or data unit, or conduct an Internet search using a mobile communication network.

The conventional notebook computer, however, has a problem in that, since it is connected to the mobile communication terminal by a separate connecting unit, the connecting unit and the mobile phone must be separately fabricated, purchased, installed/uninstalled, and transported.

Korean Patent Laid-Open Publication No. 2001-0082432 (dated Aug. 30, 2001) seeks a solution to this problem by inserting a PC card having a radio frequency unit, a CDMA processor, a memory, and an interface unit into a mobile communication terminal or into a notebook computer. More specifically, the PC card is inserted into an outer case of the mobile communication terminal for use as a mobile phone, whereas insertion of the PC card into the notebook computer enables radio data communication. Then, if a user wants to access the Internet with the notebook computer, he/she may withdraw the PC card from the mobile communication terminal and insert it into the corresponding notebook computer. The notebook computer automatically senses insertion of the PC card, and the user can then access the Internet through the notebook computer.

However, because the PCMCIA TYPE 2 card is 54 mm vide by 85.6 mm long by 5 mm thick, based on the pertinent industrial standards, a problem arises in that it is difficult to mount the radio frequency unit, the CDMA processor, the memory, the interface unit, and other components on the face of the PC card. Additionally, the PC card does not function by itself, and needs a dedicated terminal case for its use, causing inconvenience in that the dedicated terminal case must also be transported.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a radio modem terminal for mobile communication which can use an easily foldable display unit. An object of the present invention is to provide a radio modem terminal for mobile communication which can use an easily foldable power supply unit. An object of the invention is to provide a radio modem terminal for mobile communication which can use includes a PC card having a function of a mobile phone.

An object of the present invention is to provide a radio modem terminal for mobile communication that can be mounted at a notebook computer by having in a PC card a switch for selecting charging/discharging of a power supply unit.

To achieve at least the above objects in whole or in parts, there is provided a radio modem terminal for a mobile communication including: a main body having a functional unit for voice communication; a power supply unit hinged at one side of the main body forming a foldable type device; and a display unit hinged at one side of the main body and positioned between the power supply unit and the main body.

To achieve at least these advantages in whole or in parts, there is further provided a radio modem terminal for a mobile communication including: an RF unit for processing an RF input signal; a user interface for interfacing a signal transmitted to and received from a display unit; a memory unit storing various data for operating a radio modem terminal for a mobile communication; an audio interface unit for processing a voice signal; a PCMCIA interface unit for interfacing a signal transmitted and received through the user interface unit on the basis of the PCMCIA standard; a controller for monitoring a signal transmitted and received between functional units and controlling a corresponding operation; and a connector for transmitting to and receiving from a notebook computer by being connected thereto.

The present invention can be achieved in whole or in part by a radio modem terminal for mobile communication, including, a main body comprising a functional unit configured to provide voice communication capability, a power supply unit, wherein one side of the power supply unit is configured to be rotatably connected to one side of the main body, and a display unit, wherein one side of the display unit is configured to be rotatably connected to the one side of the main body, and wherein the display unit is positioned between the power supply unit and the main body.

The present invention can be further achieved in whole or in part by a radio modem terminal for a mobile communication, including, an RF unit configured to process an RF input signal, a user interface configured to interface a signal transmitted to and received from a display unit, a memory unit configured to store operating data, an audio interface unit configured to process a voice signal, a PCMCIA interface unit configured to interface a signal transmitted and received through the user interface unit based on the PCMCIA standard, a controller configured to monitor a signal transmitted and received between functional units of the radio modem terminal and to control a corresponding operation, and a connector configured to connect the radio modem terminal to a notebook computer, wherein the connector is further configured to transmit a plurality of signals to and receive a plurality of signals from the notebook computer when they are connected.

The present invention can be further achieved in whole or in part by a radio modem terminal for mobile communication, including, a main body, comprising a PC card, a power supply unit rotatably connected to the main body, and a display unit rotatably connected to the main body and the power supply unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
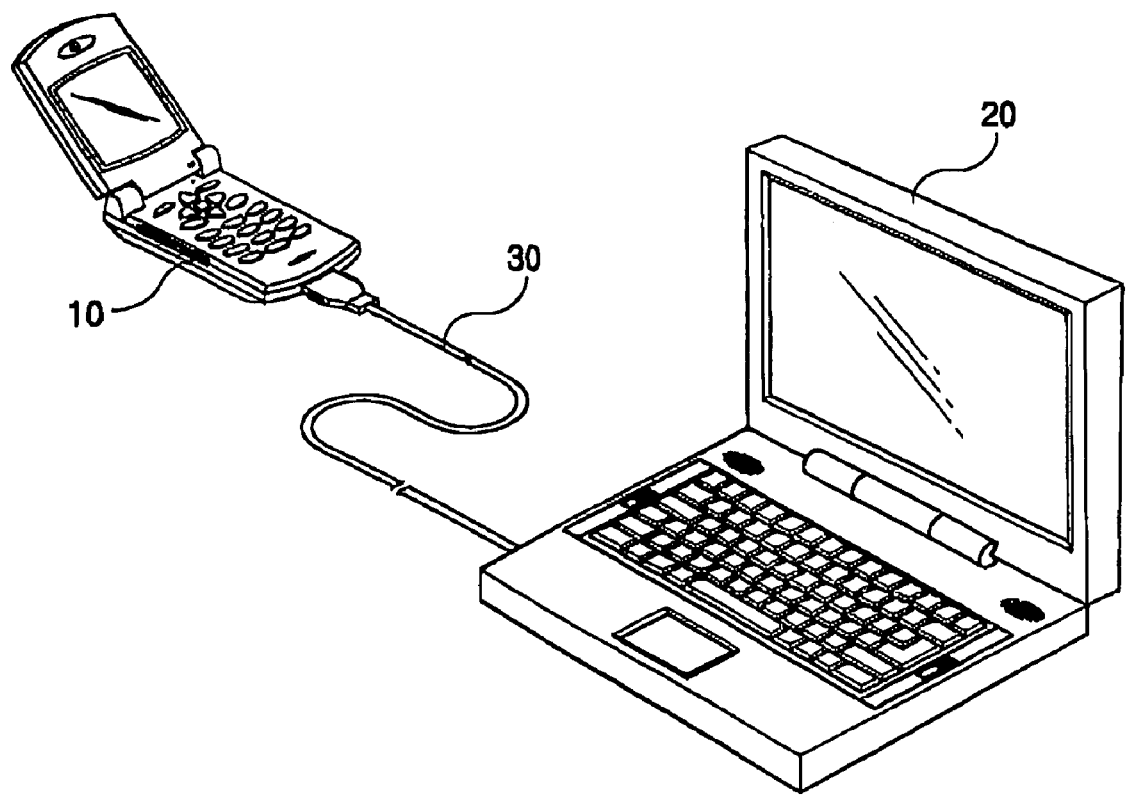
FIG. 1 illustrates how data of a notebook computer is transmitted and received in accordance with the conventional art.
Figure 2:
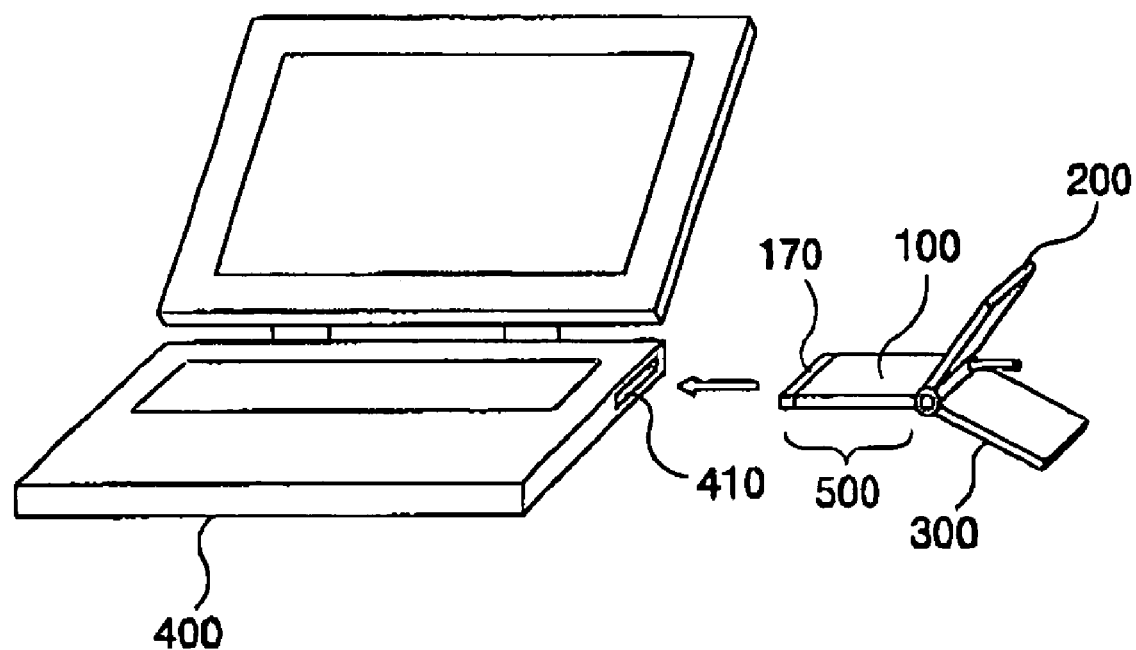
FIG. 2 illustrates an external construction of a radio modem terminal for mobile communication in accordance with an embodiment of the present invention.

As shown in FIG. 2, a radio modem terminal for mobile communication of the present invention includes: a PC card 100, a display unit 200 hinged at one side of the PC card 100; and a power supply unit 300 hinged at the part where the PC card 100 and the display unit 200 are coupled.

The PC card 100 is 54 mm wide by 85.6 mm long by 5 mm thick, as required for a standard TYPE 2 PC card, and the various functional parts required by a mobile communication terminal are included in the PC card 100, the PC card with the function parts mounted thereon constituting a main body 500.

The display unit 200 and the power supply unit 300 are attached at one side of the main body 500. The display unit 200 and the power supply unit 300 are rotated by a hinge at the other end of the PC card 100, and are opened or closed by the user as necessary.

The display unit 200 is formed as a touch pad so that it can perform an input/output function without a keypad. A connector 170 is provided at one side of the main body 500 for connection with other peripheral devices. The connector 170 has 68 pins as defined by the PC card standard.

In order for the mobile communication terminal using the PC card 100 to be connected to a data processing unit such as the notebook computer 400 to conduct radio communication, the notebook computer 400 includes a socket 410 that is able to accommodate the 68 pin connector 170.

Figure 3:
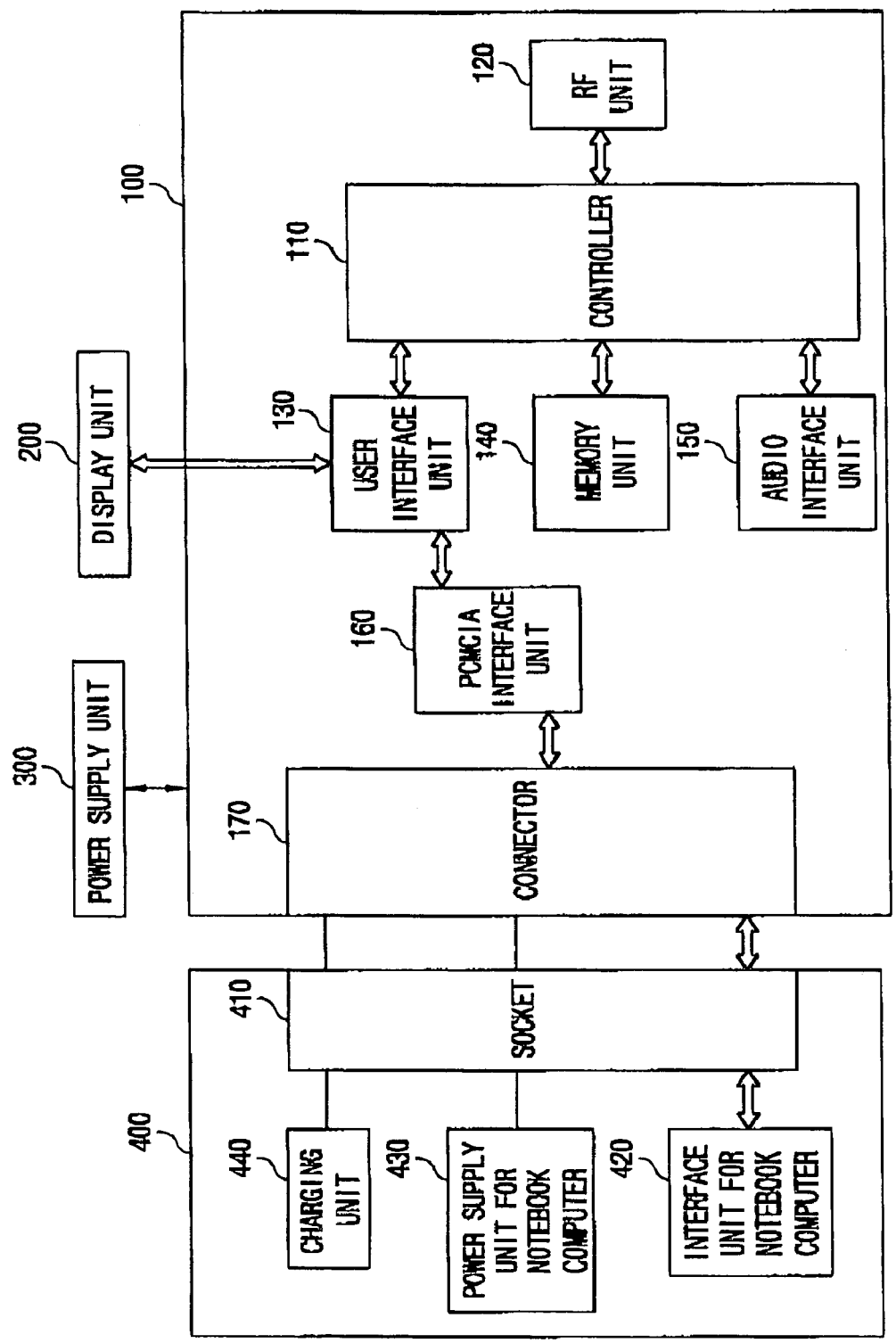
FIG. 3 is a block diagram of the inner construction of the radio modem terminal for mobile communication in accordance with an embodiment of the present invention.

FIG. 3 is a block diagram of the inner construction of the radio modem terminal for mobile communication in accordance with an embodiment of the present invention, in which the radio modem terminal for mobile communication and the notebook computer 400 are connected to each other.

As shown in FIG. 3, the radio modem terminal comprises: a controller 110 for monitoring and controlling each functional unit of the radio modem terminal; an RF (Radio Frequency) unit 120 for processing a transmission and reception radio frequency signal; a display unit 200 for inputting and displaying information based on user selection; a user interface unit 130 for interfacing information inputted through the display unit 200; a memory unit 140 for storing various programs and data for operating the mobile communication terminal; an audio interface unit 150 for processing a voice signal to enable voice communication; a PCMCIA interface unit 160 connected to the user interface unit 130 and interfacing an inputted signal to a signal based on the PCMCIA standard; a connector 170 connected to the notebook computer 400 to transmit and receive a signal of the PCMCIA interface unit 160 to and from an external device; and a power supply unit 300 for supplying power to the radio modem terminal.

The notebook computer 400 includes: a socket 410 for connecting the connector 170 of the main body 500 to the notebook computer 400; a notebook interface unit 420 for interfacing with the socket 410 and transmitting and receiving signals through the socket 410; a notebook power supply unit 430 for supplying operating power to the radio modem terminal through the socket 410 and supplying operating power to the notebook computer 400; and a charging unit 440 for charging the power supply unit 300 connected to the radio modem terminal through the socket 410.

If the radio modem terminal is connected to the notebook computer 400, the controller 110 controls the radio modem terminal such that the radio modem terminal is operated as a radio modem, whereas if the radio modem terminal transmits and receives a voice signal through the audio interface 150, the controller 110 controls the radio modem terminal such that the radio modem terminal is operated as a mobile communication terminal.

The display unit 200 can be constructed as a liquid crystal display (LCD), and preferably includes a touch pad. The user interface 130 receives a dial signal, a search signal, or transmission and reception control signal that is input by the user through the display unit 200, transmits the signal to the controller 110, and displays an operation state of the radio modem terminal on the display unit 200.

The memory unit 140 stores programs or data required for the controller 110 to control each functional unit of the radio modem terminal, and activates and outputs stored programs or data based on a request from the controller 110.

If the radio modem terminal is used as a mobile communication terminal, the audio interface unit 150 processes a transmitted and received voice signal.

The PCMCIA interface unit 160 is required if the radio modem terminal is used as a radio modem. In this case, the PCMCIA interface unit 160 is connected to the controller 110 through the user interface unit 130.

The PCMCIA interface unit 160 processes a data communication signal based on the PCMCIA standard and transmits the signal to the notebook computer 400 through the connector 170. At this time, the connector 170 is connected to the socket 410 of the notebook computer 400.

The socket 410 of the notebook computer 400 transmits a signal applied through the connector 170 of the radio modem terminal to the notebook interface unit 410. The socket 410 also transmits various signals generated by the notebook computer 400 to the radio modem terminal through the connector 170.

The notebook power supply unit 430 supplies basic power to operate each functional part of the notebook computer 400. The power supply unit 430 also supplies power to the radio modem terminal when the socket 410 and the connector 170 are connected.

The charging unit 440 charges the power supply unit 300 of the radio modem terminal for mobile communication, while the notebook power supply unit 430 supplies power to the radio modem terminal while the notebook computer 400 and the radio modem terminal are connected. At this time, the notebook power supply unit 430 and the charging unit 440 are connected to the pins of the socket 410, and the pins of the socket 410 are connected to corresponding pins of the connector 170.

Figure 4:
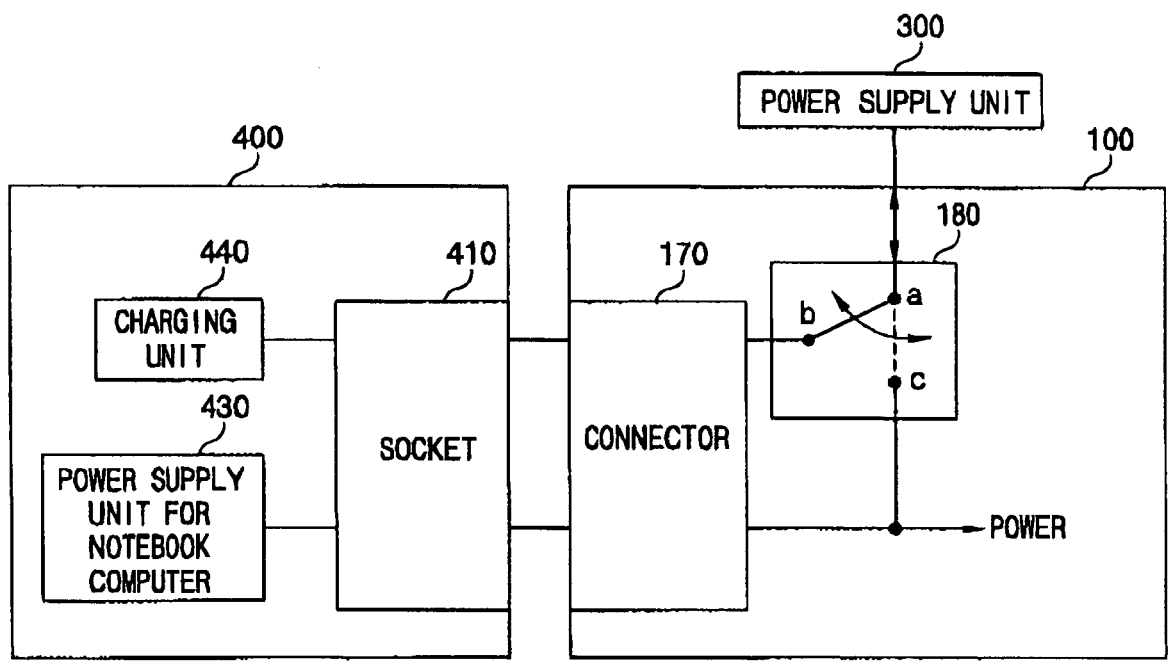
FIG. 4 is a schematic view of a switch of the radio modem terminal for mobile communication in accordance with an embodiment of the present invention.

FIG. 4 is a detailed view of a switch of the radio modem terminal for mobile communication in accordance with an embodiment of the present invention.

As shown in FIG. 4, the radio modem terminal for mobile communication includes a switch 180 for connecting the connector 170 and the power supply unit 300. The switch 180 operates by automatically sensing a connection between the radio modem terminal and the notebook computer 400.

That is, when the radio modem terminal and the notebook computer 400 are connected, terminals 'a' and 'b' of the switch 180 are connected. When sensing this connection, the switch 180 supplies operating power from the notebook power supply unit 430 to the radio modem terminal. It also supplies power from the charging unit 440 to the power supply unit 300 in order to charge it.

If, however, the radio modem terminal is not connected to the notebook computer 400, the terminals 'a' and 'c' of the switch 180 are connected, causing the notebook power supply unit 430 to be shorted. Operating power outputted from the power supply unit 300 is then supplied to each functional part of the radio modem terminal, and accordingly, the radio modem terminal operates as a mobile communication terminal.

The operation of the radio modem terminal will now be described in detail. The display unit 200 and the power supply unit 300 of the radio modem terminal are opened from the PC card 100, and the connector 170 of the PC card 100 is installed in the socket 410 of the notebook computer 400. As the terminals 'a' and 'b' are connected in the switch 180 of the radio modem terminal, the radio modem terminal would use power supplied by the notebook computer 400 as its operating power, and would operate in the PC card mode according to the user's manipulation.

When the radio modem terminal is intended to be used as a mobile communication terminal, the display unit 200 is opened and the touch pad is manipulated just like a typical foldable type mobile communication device. Then, the radio modem terminal senses a non-connection of the socket 410 of the notebook computer 400 to the connector 170, and accordingly, it is switched to the mobile communication terminal mode and uses power supplied by the power supply unit 300 for its operating power.

The radio modem terminal can be also used as a mobile communication terminal in the PC card mode. That is, while the radio modem terminal is not performing a radio data communication, the user may initiate voice communication by using the display unit 200 and a mobile communication terminal headset (not shown).

As so far described, the radio modem terminal for mobile communication has an advantage in that, by integrating the mobile communication terminal and the PC card into one body, the user does not need to carry a PC card separate from the mobile communication terminal. Accordingly, this approach is not only economical but also more convenient when being transported and used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A radio modem terminal for mobile communication, comprising:
   a body comprising a functional unit which provides voice communication capability;
   a power supply unit separate from the body and rotatably connected to a first side of the body; and
   a display unit separate from the body and the power supply unit, wherein the display unit is rotatably connected to the first side of the body connected to the first side of the body so as to be positioned between the power supply unit and the body.

2. The terminal of claim 1, further comprising a hinge structure which rotatably connects the body, power supply unit, and display unit, said hinge structure forming a foldable mobile communication device from the rotatably connected body, power supply unit, and display unit.

3. The terminal of claim 1, wherein the body comprises a standard PCMCIA TYPE 2 PC card.

4. The terminal of claim 1, wherein the body further comprises a connector which connects the radio modem terminal to a notebook computer, said connector coupled to a second side of the body.

5. The terminal of claim 4, wherein an operation mode of the radio modem terminal is based on a connection between the radio modem terminal and the notebook computer.

6. The terminal of claim 5, wherein the operation mode comprises:
a PC card mode if the radio modem terminal is connected to a notebook computer; and
a mobile communication terminal mode with voice communication capability if the radio modem terminal is not connected to a notebook computer.

7. The terminal of claim 1, wherein the display unit comprises a liquid crystal display (LCD) with a touch pad attached thereto for receiving information from a user.

8. A radio modem terminal for mobile communication, comprising:
a main body comprising a PC card;
a power supply unit separate from the main body and connected to a first side of the main body; and
a display unit separate from the main body and the power supply unit, wherein the display unit is connected to the first side of the main body, and wherein the main body, the power supply unit and the display unit are rotatably connected to form a foldable type mobile communication device.

9. The radio modem terminal of claim 8, wherein an end of the power supply unit, an end of the display unit, and an end of the main body are all rotatably connected to one another by a hinge structure.

10. The radio modem terminal of claim 8, wherein the main body further comprises a connector formed at one end of the PC card, wherein the connector is configured to connect the radio modem terminal to a notebook computer.

11. The radio modem terminal of claim 10, wherein an operation mode is determined based on a connection status between the radio modem terminal and the notebook computer.

12. The radio modem terminal of claim 11, wherein the operation mode comprises at least a PC card mode, wherein the radio modem terminal is connected to the notebook computer, and a mobile communication terminal mode, wherein the radio modem terminal is not connected to the notebook computer.

13. The radio modem terminal of claim 10, wherein the connector is connected to a switch configured to determine a connection path between the connector and the power supply unit based on a connection status between the radio modem terminal and the notebook computer.

14. The radio modem terminal of claim 13, wherein an external power source provides a primary source of operating power to the radio modem terminal via a connection path formed by the connector and the power supply unit when the notebook computer and the radio modem terminal are connected.

15. The radio modem terminal of claim 13, wherein power supplied by the power supply unit provides a primary source of operating power to the radio modem terminal when the notebook computer and the radio modem terminal are not connected.

16. The radio modem terminal of claim 10, wherein the notebook computer comprises:
a socket configured to receive the connector;
a power supply unit for the notebook computer configured to supply power to a plurality of systems of the notebook computer, and to supply power to the radio modem terminal through the connector; and
a charging unit configured to charge the power supply unit of the radio modem terminal through the connector, wherein the power supply unit for the notebook computer and the charging unit are further configured to supply power to the radio modem terminal when the notebook computer and the radio modem terminal are connected.

17. The radio modem terminal of claim 8, wherein the display unit comprises an LCD, wherein the LCD is configured to allow a user to input information.

18. The radio modem terminal of claim 17, wherein the LCD comprises a touch screen.

19. The radio modem terminal of claim 8, wherein the power supply unit is configured to receive and store power supplied by an external power source, and to supply power to the radio modem terminal in the absence of an external power source.

20. The radio modem terminal of claim 8, wherein the PC card comprises:
an RF unit configured to process an RF input signal;
a user interface configured to interface a signal transmitted to and received from the display unit; a memory unit configured to store operating data;
an audio interface unit configured to process a voice signal;
a controller configured to monitor a plurality of signals transmitted and received between functional units of the radio modem terminal and to control a plurality of corresponding operations; and
a connector formed at one end of the PC card is configured to connect the radio modem terminal to a notebook computer, wherein the connector is further configured to transmit a plurality of signals to and receive a plurality of signals from the notebook computer when they are connected.

* * * * *